April 18, 1967  W. E. JACOBSON  3,315,203
LOAD CELL DEVICE
Filed Nov. 5, 1964

INVENTOR.
WALTER E. JACOBSON
BY *Lester W. Clark*
ATTORNEY

United States Patent Office 3,315,203
Patented Apr. 18, 1967

3,315,203
LOAD CELL DEVICE
Walter E. Jacobson, Meriden, Conn., assignor to Revere Corporation of America, Wallingford, Conn., a corporation of New Jersey
Filed Nov. 5, 1964, Ser. No. 409,168
7 Claims. (Cl. 338—5)

This invention relates to force measuring apparatus and, more particularly, to apparatus of the type commonly known as a load cell.

The invention is directed to a load cell formed of elastic material and having one or more strain sensitive elements such as strain sensitive resistance elements attached to parts of the cell. The cell is adapted to support a load either in tension or compression and, when loaded, is deformed and thereby subjects the strain sensitive resistance elements to corresponding deformation. The electrical resistance characteristics of the resistance elements change in accordance with the deformation, and hence the resistances of the elements may be utilized as a measure of the load applied to the cell.

Load cells in use often are subjected to changing temperatures, and it is important that such changing temperatures do not affect the resistance elements in such a fashion as to render the measurement of a force by the load cell dependent upon temperature. Further, load cells in use are subjected to widely varying loads and quite often the load is not squarely applied to a particular load cell. It is important that the strain sensitive elements undergo deformation such that they provide an accurate indication of the vertical component of an applied load regardless of the direction from which the load is applied to the cell and whether or not the load is applied to a particular point or over an area of the cell.

Accordingly, it is an object of the present invention to provide a load cell which, although subjected to temperature variations, provides an output indication of a force applied to the cell which does not vary with such temperature variations.

It is a further object of the present invention to provide a load cell whose output is directly related to the vertical component of a load impressed on the cell whether it be applied in tension or compression.

It is a still further object of the present invention to provide a load cell of improved accuracy.

These and other objects are achieved in the embodiment of the present invention described herein, through the use of a load cell formed from a block of elastic material. The term "block" is herein intended to mean a structure of any configuration. Typically, however, the block is of generally rectangular cross section. The block has one end upon which it is supported, an opposite parallel end adapted to receive an applied force to be measured, front and rear faces opposite from and parallel to each other, and two side faces opposite from and parallel to each other. A main hole extends through the block from the front face to the rear face intermediate the ends of the block, and has a surface at least portions of which are arcuate adjacent to the side faces of the block. These side faces are formed with arcuate recesses each of which has a curvature substantially equal to that of the adjacent arcuate portion of the surface of the hole. The axes of the hole and the arcuate recesses all lie in the same plane, and are spaced from each other so that the hole and the recesses together are effective to reduce portions of the block to two parallel columns, each having a narrow neck and flaring from the neck toward both ends. Strain sensitive elements, such as strain sensitive electrical resistance elements, are attached to the columns on the arcuate portions of the surface of the cylindrical hole and within the arcuate recesses in the side faces of the block. All strain sensitive elements are thus positioned at equal distances from either end of the block, and because of the matching of the curvatures of the arcuate recesses and the arcuate portions of the surface of the hole, a changing temperature will have no effect on the strain sensitive elements. That is, temperature changes are conducted through the block so that the strain sensitive elements are heated or cooled, as the case may be, simultaneously and thus undergo the same temperature responsive changes. The strain sensitive elements are typically connected in a bridge circuit, and the temperature changes have no effect whatsoever on the balance of the bridge. The input to the bridge may include one or more resistance elements having a positive temperature coefficient or resistance and which are mounted on strain-free areas of the load cell. Such elements provide temperature compensation for the coefficient of elasticity of the elastic material of the block, which changes with temperature. In this fashion, temperature changes do not affect the output reading of the load cell regarding the measurement of force applied to the cell.

Further, the hole and the recesses create stress concentrations adjacent to the strain sensitive elements, so as to increase the sensitivity of the load cell. The bridge connections of the elements also provide a compensation for errors due to eccentric or side loads, so that if such loads occur the force measurement is not affected by the manner in which the load is applied to the cell.

Additionally, the elastic block may include a transverse hole or holes extending from one of the arcuate recesses in one side face to the other arcuate recess in the other side face and intersecting the main hole through the block. Such a transverse hole or holes increase the moment of inertia of the cross section of the load cell taken in any horizontal plane intersecting the strain sensitive elements, as compared with a load cell without such a transverse hole but whose cross section in the same plane is of the same area. Thus the transverse hole or holes, which may or may not be included as desired, create a more stable structure in the regions of the strain sensitive elements which is especially useful in applications involving eccentric, side or heavy loads.

Still further, the elastic block includes first and second pairs of holes on both sides of the main hole through the block, adjacent to the ends of the block and extending parallel to the main hole. Each hole of the pair is connected by a slot through the block to the adjacent side face of the block. This arrangement tends to concentrate the forces applied to the block in small sections of the block adjacent to the main hole, thereby increasing the sensitivity of the load cell to applied forces.

The invention will be more completely understood by reference to the following detailed description of representative embodiments thereof, which should be read in conjunction with the appended drawings, in which.

Figure 1:
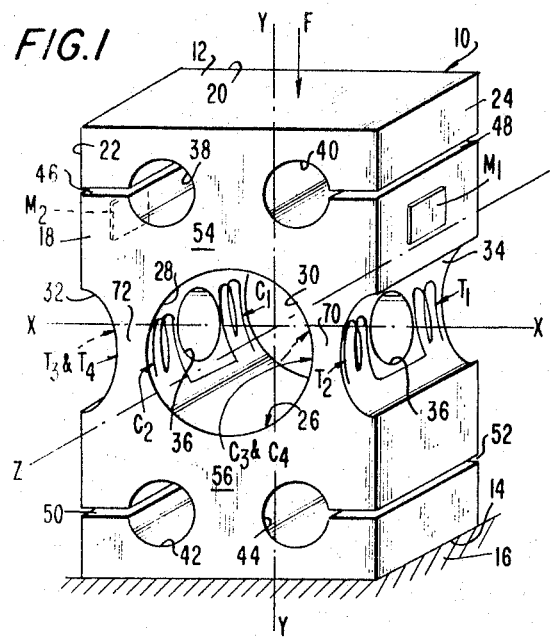
FIG. 1 is a perspective view of a typical load cell in accordance with the present invention.

Referring to FIG. 1, a load cell 10 in accordance with the present invention comprises a block of elastic material having an upper end 12 adapted to receive an applied force, as represented by the arrow designated F, and a lower end 14 adapted to rest upon or be attached to a suitable base structure 16. The block is also formed with a front face 18 and a rear face 20, as well as side faces 22 and 24. A main hole 26 extends through the load cell from the front face 18 to the rear face 20. The hole is typically circular in cross section, having as its axis the Z axis of the load cell. In any event, the surface of the hole includes arcuate portions 28 and 30 respectively adjacent to the side faces 22 and 24.

The side faces 22 and 24 include arcuate recesses 32 and 34, respectively, each of which has the same curvature as the adjacent one of the arcuate portions 28 and 30 of the hole 26. A transverse hole 36 extends through the center of the load cell transverse to the main hole 26 from the side face 22 to the side face 24. The axis of the transverse hole is the X axis of the load cell, and the hole is typically circular in cross section. More than one transverse hole may be included, if desired.

Strain sensitive elements shown schematically in FIG. 1 and designated $T_1$ through $T_4$ and $C_1$ through $C_4$ are attached to the arcuate surfaces of the load cell. Specifically, strain sensitive elements $T_1$ and $T_2$ are located in the arcuate recess 34 of the side face 24, while resistance elements $T_3$ and $T_4$ are located in the arcuate recess 32 of the side face 22. The elements $T_1$ and $T_3$ are located to the rear of the transverse hole 36, while elements $T_2$ adn $T_4$ are located on the forward side of the transverse hole 36. Elements $C_1$, $C_2$, $C_3$ and $C_4$ are all located in the main hole 26, with the elements $C_1$ and $C_2$ being positioned on the arcuate portion 28 of the surface of the hole and the elements $C_3$ and $C_4$ being positioned on the arcuate portion 30. Resistance elements $C_1$ and $C_3$ are located adjacent to the rear face 20 of the load cell, while elements $C_2$ and $C_4$ are located adjacent to the front face 18.

The strain sensitive elements $T_1$ through $T_4$ and $C_1$ through $C_4$ are typically resistance elements whose resistances change in accordance with the deformation of the elements as the cell is subjected to load. Of course, the elements could be other types of sensing devices, such as semiconductor strain sensitive elements. As shown in FIG. 1, the elements $T_1$ through $T_4$ and $C_1$ through $C_4$ are loops of wire, the resistances of which change as the cell is subjected to a load. Each loop preferably extends vertically for a distance roughly equal to the diameter of the transverse hole 36, although the vertical extent of each loop may be more or less than this diameter.

A pair of resistance elements $M_1$ and $M_2$, each having a positive temperature coefficient of resistance, are respectively mounted on the sides 24 and 22 of the block above the arcuate recesses 34 and 32. These resistance elements are mounted on strain-free surfaces of the load cell, and hence change in resistance only as the temperature of the block changes.

The block of elastic material also includes a first pair of holes 38 and 40 and a second pair of holes 42 and 44. The holes 38 and 40 of the first pair are positioned intermediate the main hole 26 and the upper end 12 of the block, and extend through the block from the front face 18 to the rear face 20. The holes 38 and 40 have their axes parallel to the axis of the main hole 26. The hole 38 is adjacent to the side face 22, and a slot 46 extends through the block from the front face 18 to the rear face 20 and from the side face 22 to the hole 38. A similar slot 48 extends through the block from the front face 18 to the rear face 20 and from the side face 24 to the hole 40. The holes 42 and 44 comprising the second pair are located intermediate the main hole 26 and the bottom end 14 of the block, and extend through the block substantially parallel to the main hole 26. Slots 50 and 52 extend through the block from the front face 18 to the rear face 20 and respectively from the side faces 22 and 24 respectively to the holes 42 and 44.

As thus constructed, the block 10 of elastic material is essentially a ring-shaped structure with the hole 26 forming the central opening of the ring. The holes 38, 40 of the first pair and the holes 42, 44 of the second pair serve to concentrate strains in the areas designated 54 and 56 respectively adjacent to the top and bottom portions of the main hole 26. These holes thus render the structure more sensitive to loads applied to the top end 12 of the block.

Figure 2:
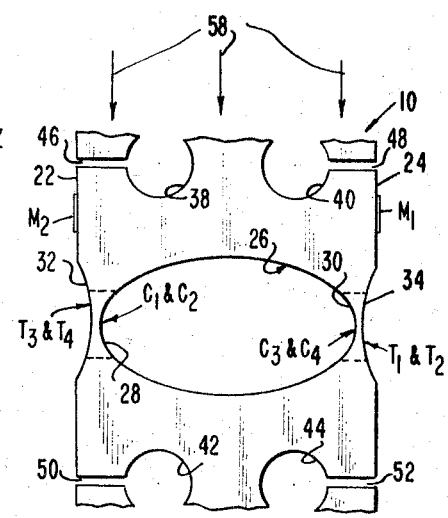
FIG. 2 is a grossly exaggerated front view of a portion of the load cell of FIG. 1 showing the effect of a load applied to the cell.

FIG. 2 shows the effect of loading applied to the cell of FIG. 1. It is assumed for the purpose of illustration that a load is applied uniformly to the top of the cell as represented by arrows designated 58. Such a load tends to distort the cell, as shown to an exaggerated degree in the figure, such that the hole 26 is changed in cross section from a circle generally to an ellipse. In particular, the arcuate portions 28 and 30 of the surface of the hole are compressed so that the strain sensitive resistance elements $C_1$, $C_2$ and $C_3$, $C_4$, respectively, are compressed. This increases the diameter and shortens the length of the wires forming these resistance elements to decrease the resistances of the elements. The load applied to the cell also deforms the arcuate recesses 32 and 34 of the side faces 22 and 24, respectively, so as to tend to increase the length of the arc of each recess. This deformation subjects the resistance elements $T_1$, $T_2$ and $T_3$, $T_4$ to tension which decreases the diameter of and lengthens the wires forming these elements. Such a decrease in diameter causes an increase in the resistances of the elements.

It will be noted, then, that a load applied to the cell tends to cause the resistance elements $C_1$ through $C_4$ to be compressed and hence to decrease in resistance, while the resistance elements $T_1$ through $T_4$ are subjected to tension which increases their resistances. This relationship holds true for all loads applied to the load cell 10 other than loads distorting the cell such that the elements $C_1$, $C_2$, $T_3$ and $T_4$ are all in compression while the elements $C_3$, $C_4$, $T_1$ and $T_2$ are all in tension, for example.

Figure 3:
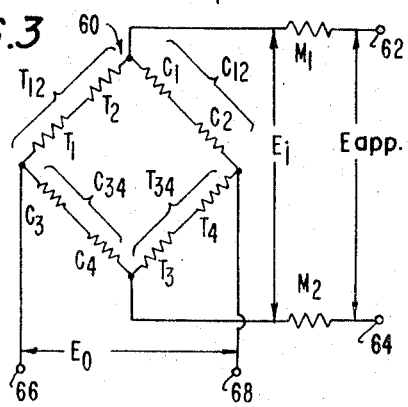
FIG. 3 is a schematic circuit diagram showing a suitable arrangement of the strain sensitive resistance elements forming a portion of the load cell of FIG. 1 connected in a bridge circuit to provide an output signal representative of the load applied to the cell.

FIG. 3 shows a bridge circuit 60 in which the resistance elements are connected to provide a suitable output signal representative of a force applied to the load cell. The resistance elements $T_1$ and $T_2$ are connected in series in an arm of a bridge 60 opposite from another arm of the bridge containing resistance elements $T_3$ and $T_4$ connected in series. Resistance elements $C_1$ and $C_2$ are connected in series in an arm of the bridge opposite from the remaining arm of the bridge which contains the resistance elements $C_3$ and $C_4$ connected in series. An input signal, designated $E_i$, is applied to the bridge. This signal is developed from a source of potential (not shown), designated $E_{app}$, coupled to input terminals 62 and 64 and thence through resistance elements $M_1$ and $M_2$ to the bridge. An output signal, designated $E_o$, is derived from the bridge through terminals 66 and 68. It can be shown that in the bridge 60 the ratio of the output signal $E_o$ to the input signal $E_i$ is as follows:

$$\frac{E_o}{E_i} = \frac{C_{12}C_{34} - T_{12}T_{34}}{(C_{12}+T_{34})(T_{12}+C_{34})} \quad (1)$$

In Equation 1, $C_{12}$ is the series impedance of the resistance elements $C_1$ and $C_2$, $C_{34}$ is the series impedance of the resistance elements $C_3$ and $C_4$, $T_{12}$ is the series impedance of the resistance elements $T_1$ and $T_2$ and $T_{34}$ in the series impedance of the resistance elements $T_3$ and $T_4$.

In the balance condition of the bridge, namely when no load is applied to the load cell 10, $E_0$ in Equation 1 typically is zero, although a potential other than zero may be chosen for this condition. If in the balance condition of the bridge $E_o$ is zero, then the following relationship exists:

$$C_{12}C_{34} = T_{12}T_{34} \quad (2)$$

As a load is applied to the load cell, the impedances of all the tension-experiencing resistance elements $T_1$ through $T_4$ increase, while the impedances of all the compression-experiencing resistance elements $C_1$ through $C_4$ decrease, at least within the normal range of loads applied to the load cell, as explained above. From Equation 1 it is apparent, then, that the difference represented by the numerator in the right-hand side of the equation increases. The denominator, however, remains substantially constant, inasmuch as in each of the sums in the denominator of the fraction any increase in impedance is offset by a corresponding decrease. For example, the impedance $C_{12}$ decreases with increasing load, while the impedance $T_{34}$ increases with such increasing load. Hence, because of the increase in the numerator of the fraction, the ratio of $E_o$ to $E_i$ is increased, and an increased output signal is generated at the output terminals 66 and 68 of FIG. 3.

Referring again to FIG. 1, it is apparent that the strain sensitive resistance elements $T_1$ through $T_4$ and $C_1$ through $C_4$ are all positioned at substantially equal distances from either end 12 or 14 of the load cell. That is, although each of the resistance elements extends vertically, corresponding points on all the elements all are the same distance from either end of the load cell. For example, consider the resistance elements $T_2$ and $C_4$ respectively located opposite each other in the arcuate recess 34 and on the arcuate portion 30 of the surface of hole 26. Each point on the resistance element $T_2$ and its corresponding point on the resistance element $C_4$ are located the same distance from the end 12, for example. This is brought about by the matching of the curvatures of the arcuate recess 34 and the arcuate portion 30 of the surface of hole 26 and the positioning of the resistance elements $T_2$ and $C_4$ directly opposite each other.

By so positioning all the resistance elements and by matching the arcuate portions 28 and 30 of the surface of the hole 26 respectively with the arcuate recesses 32 and 34, temperature changes in the vertical direction affect all of the resistance elements equally. In particular, any heat conducted upwardly or downwardly through the load cell 10 passes through sections 70 and 72 of the cell which are respectively adjacent to the arcuate recesses 34 and 32 which lie between the recesses and the hole 26. Since the load cell is symmetrical about the Y–Z plane, the heat is conducted through the sections 70 and 72 substantially equally, so that any temperature gradient within the cell in a vertical direction is the same in the load cell section 70 as it is in the load cell section 72. This ensures that corresponding points on all the resistance elements $T_1$ through $T_4$ and $C_1$ through $C_4$ experience the same temperature, and hence a temperature gradient through the cell in the vertical direction has no effect on the output reading of the load cell. Note in Equation 1 that each impedance term appears once in the numerator on the right-hand side of the equation and once in the denominator. Hence any change in the numerator of the fraction due to a temperature change is accompanied by a corresponding change in the denominator, so that the ratio of $E_o$ to $E_i$ remains constant regardless of temperature change. This applies for both load and no-load conditions in the load cell.

The resistance elements $M_1$ and $M_2$, mounted on strain-free areas of the load cell and connected as shown in the circuit of FIG. 3, serve to compensate for the effects of temperature changes upon the modulus of elasticity of the block of elastic material forming the load cell. In particular, as the temperature of the load cell changes, the modulus (the ratio of unit stress to unit strain) changes. Hence, for a given load, with a temperature change the strain sensitive resistance elements undergo a change in strain and exhibit changing resistances. Such resistance changes would cause the output signal $E_o$ to change event through the load has not changed, unless the input signal $E_i$ is caused to correspondingly change. The temperature sensitive resistance elements $M_1$ and $M_2$ vary the portion of the input signal $E_{app}$ that is applied to the bridge in accordance with temperature, thereby to compensate for the changing modulus of elasticity of the block of elastic material.

In this fashion, the resistance elements $T_1$ through $T_4$ and $C_1$ through $C_4$ are positioned in the load cell so that changes in resistivity due to temperature changes affect all elements equally and effectively cancel each other in the bridge circuit of FIG. 3. At the same time, the resistance elements $M_1$ and $M_2$ change in resistance due to such temperature changes to vary the potential applied to the bridge circuit so that changes in the modulus of elasticity of the load cell caused by the temperature changes do not affect the output signal. As a result, for both load and no-load conditions of the load cell, the output signal from the bridge circuit is relatively insensitive to temperature changes.

The recesses 32 and 34 adjacent to the hole 26 also serve to increase the sensitivity of the load cell by creating stress concentrations. Referring to FIG. 1, it will be noted that the sections 70 and 72 of the block respectively adjacent to the arcuate recesses 34 and 32 are each of a minimum thickness (measured in the direction of the X axis) at the X–Z plane. Above and below the plane, the thickness of each section increases as the distance from that plane increases. The sections 70 and 72 constitute parallel columns each having a narrow neck and flaring from the neck toward both ends. A stress concentration is thus created exactly at the central portions of each of the arcuate recesses 32 and 34 and the arcuate portions 28 and 30 of the surface of the hole 26. This tends to increase the sensitivity of the load cell by rendering the strain per unit area of load cell adjacent to the strain sensitive resistance elements higher than at other portions of the cell not adjacent to the resistance elements.

Figure 5:
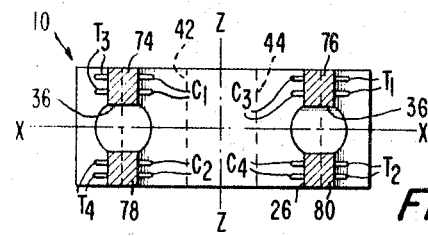
FIG. 5 is a cross-sectional view taken on the X–Z plane of the load cell of FIG. 1.
Figure 6:
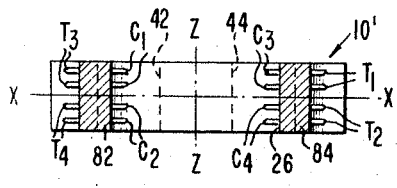
FIG. 6 is a similar view taken on the corresponding plane of the load cell of FIG. 4.

The transverse hole 36 of the load cell of FIG. 1 serves to increase the moment of inertia of sections of the cell adjacent to the strain sensitive resistance elements, which creates a more stable structure when subjected to eccentric or side loads. In particular, the increase of moment of inertia is as compared with a similar load cell, shown in FIG. 4, not having such a transverse hole but of the same cross-sectional area as viewed in section along the X–Z axes. A section along the X–Z plane of the load cell of FIG. 1 is shown in FIG. 5, while FIG. 6 shows a similar section for the load cell of FIG. 4 having the same area of cell in section but not including a transverse hole. In FIG. 5, the load cell 10 presents four areas 74, 76, 78 and 80 grouped on both sides of the X axis. In FIG. 6, load cell 10' presents two areas 82 and 84, a half portion of each of which is located on either side of the X axis. The areas 82 and 84 together total the same area as the sum of areas 74, 76, 78 and 80 in FIG. 5. It is clear from inspection of FIGS. 5 and 6 that the moment of inertia about the X axis of the section of the load cell 10 shown in FIG. 5 is much greater than the moment of inertia about the X axis of the section of the cell 10' shown in FIG. 6. The transverse hole 36 accounts for the increase in moment of inertia; the increase makes a more stable structure in the regions of the resistance elements $T_1$ through $T_4$ and $C_1$ through $C_4$, especially suitable for heavy, eccentric or side loads.

Figure 4:
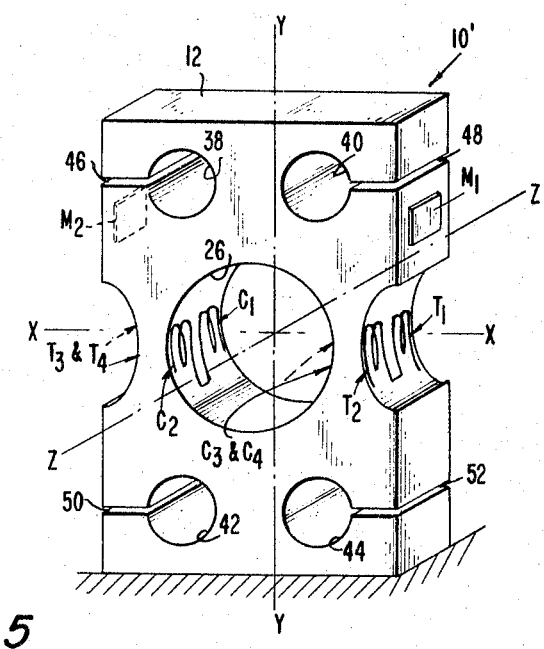
FIG. 4 is a perspective view of an alternative form of load cell in accordance with the present invention.

The transverse hole is not necessary, however, and FIG. 4 shows a load cell in which the hole is missing. This type of structure may be used, for example, in a load cell employed as a sensitive element in a pressure transducer, in which case the load is always evenly distributed and centralized. For load cells which must carry eccentric or side loads, however, the transverse hole provides a substantial advantage.

The disposition of the resistance elements $T_1$ through $T_4$ and $C_1$ through $C_4$ in the load cells of FIGS. 1 and 4, and the connection of the elements as shown in FIG. 3 in the bridge circuit 60, ensures that each load cell provides a proper output signal representative of the vertical component of an applied force, whether the applied force is an eccentric or side load or applied at a point rather than to an area. The following examples illustrate the response of the cell to different loading conditons.

The first example concerns an eccentric load applied to the cell. In this case an eccentric load is intended to mean a load which is applied vertically to the upper end 12 of the cell at one or more points on the upper end, but which is represented by a single force vector on either side of the Y–Z plane. For example, assume that an ecentric load is applied to the right of the Y–Z plane, as represented by the vector F in FIG. 1. As compared with a non-eccentric load previously applied to the load cell in line with the Y axis, the load cell is distorted so that the following changes take place in the resistance elements:

$T_1$ and $T_2$ increase in tension (impedance $T_{12}$ increases);
$C_3$ and $C_4$ decrease in compression (impedance $C_{34}$ increases);
$C_1$ and $C_2$ increase in compression (impedance $C_{12}$ decreases);
$T_3$ and $T_4$ decrease in tension (impedance $T_{34}$ decreases).

Writing Equation 1 above using superscript notation to represent the increase or decrease in each impedance, as $\wedge$ for an increase and $\vee$ for a decrease, Equation 1 is represented as follows:

$$\frac{E_o}{E_i} = \frac{\check{C}_{12}\hat{C}_{34} - \hat{T}_{12}\check{T}_{34}}{(\check{C}_{12}+\check{T}_{34})(\hat{T}_{12}+\hat{C}_{34})} \quad (3)$$

From Equation 3 it will be noted that each impedance increase is counteracted by a corresponding impedance decrease so that, for ideal conditions, the ratio of $E_o$ to $E_i$ does not change simply because of the load is not applied uniformly directly downwardly to the top end 12 of the load cell over all points on the top surface, for example.

As another example, assume a vertical load applied to the load cell of either FIG. 1 or FIG. 4 is changed to a side load of the same magnitude. A side load is represented by a force vector against the top end 12 of the load cell at an angle other than a right angle. Such a load may be resolved into a vertical component and a side component perpendicular to one of the side faces 22 and 24. The vertical component is necessarily of reduced magnitude compared with the magnitude of the vertical load. Hence the vertical component alone causes an output signal $E_o$ of reduced magnitude to be generated. In the case of the side component, assume that this component is against the side face 22. In such a case, the load cell is distorted so that the following changes take place in the resistance elements:

$T_1$ and $T_2$ decrease in tension (impedance $T_{12}$ decreases);
$C_3$ and $C_4$ increase in compression (impedance $C_{34}$ decreases);
$C_1$ and $C_2$ decrease in compression (impedance $C_{12}$ increases);
$T_3$ and $T_4$ increase in tension (impedance $T_{34}$ increases).

Equation 1 rewritten in the form of Equation 3 expresses these changes as follows:

$$\frac{E_o}{E_i} = \frac{\hat{C}_{12}\check{C}_{34} - \check{T}_{12}\hat{T}_{34}}{(\hat{C}_{12}+\hat{T}_{34})(\check{T}_{12}+\check{C}_{34})} \quad (4)$$

As in the case of Equation 3, each change in an impedance term is generally offset by a corresponding change in another impedance term so that the ratio of $E_o$ to $E_i$ is not affected by the side component. The ratio $E_o$ to $E_i$, then, for side loads is representative only of the vertical component of the force that is applied to the load cell.

From the description above, it is apparent that a unique load cell has been provided which minimizes error due to temperature changes and loading conditons. The embodiments of the invention shown and described are subject to modifications which will suggest themselves to those skilled in the art. The invention, therefore, should be taken to be defined by the following claims.

What is claimed is:
1. A load cell, comprising:
   (a) a block of elastic material having:
      (1) one end upon which it is adapted to be supported;
      (2) an opposite parallel end adapted to receive an applied force to be measured;
      (3) two opposite side faces;
      (4) opposite front and rear faces;
      (5) an aperture extending from the front face to the rear face, in a direction substantially parallel to and spaced from both ends and both side faces, said aperture having at least those portions of its surface nearest the side faces of arcuate cross-section, with the axes of curvature of said arcuate cross-section portions substantially parallel to said ends and to said side faces;
      (6) recesses of arcuate cross-section extending across said side faces from the front face to the rear face, the axes of curvature of said recesses lying in the same plane as the axes of curvature of said arcuate cross-section portions of said aperture surface and the radius of the arcuate recesses being substantially equal to the radius of the arcuate cross-section portions of the aperture;
      (7) said recesses and said aperture cooperating to define two parallel columns integral with the block, each column having a narrow neck and flaring from the neck toward both ends; and
   (b) a plurality of strain sensitive elements attached to the columns on the arcuate cross-section surfaces thereof.

2. A load cell as defined in claim 1, in which the length of the arcs in said recesses of arcuate cross-section is shorter than a semicircle.

3. A load cell as defined in claim 1, in which:
   (a) at least portions of said opposite front and rear faces are plane and parallel; and
   (b) said aperture extends between certain of the parallel plane portions of the front and rear faces.

4. A load cell as defined in claim 1, in which said block has a second aperture extending through it and opening on said side faces, said second aperture having at least those portions of its surface nearest the front and rear faces of arcuate cross-section, said second aperture being parallel to the top and bottom faces and intersecting said first-mentioned aperture at right angles, said arcuate cross-section portions of said second aperture cooperating with said faces and said arcuate cross-section portions of said first-mentioned aperture to define four spaced parallel to columns integral with said block and having their vertical axes located at the corners of a rectangle, each column having a narrow neck and flaring from the neck toward both ends thereof, said four columns having matching curvatures and thus undergoing the same temperature responsive changes.

5. A load cell as defined in claim 4, in which said first-mentioned aperture and said second aperture are both circular in cross-section and intersect substantially at right angles.

6. A load cell as defined in claim 5, in which said second aperture extends between the recesses in said side faces.

7. A load cell as defined in claim 6, in which the axis of curvature of said second aperture lies in the same plane with and intersects the axes of curvature of said recesses and said first-mentioned aperture.

References Cited by the Examiner

UNITED STATES PATENTS

| | | | |
|---|---|---|---|
| 2,414,161 | 1/1947 | Moore | 73—88.5 X |
| 2,561,318 | 7/1951 | Ruge | 338—5 |
| 2,796,503 | 6/1957 | Ward | 338—5 |
| 3,004,231 | 10/1961 | Laimins | 338—5 |
| 3,110,175 | 11/1963 | Seed | 73—88.5 X |
| 3,130,383 | 4/1964 | Hottinger | 338—5 |
| 3,136,157 | 6/1964 | Seed et al. | 73—88.5 X |
| 3,161,046 | 12/1964 | Farley | 73—141 |
| 3,222,628 | 12/1965 | Pien | 338—4 |

ANTHONY BARTIS, *Primary Examiner.*

RICHARD M. WOOD, *Examiner.*

W. D. BROOKS, *Assistant Examiner.*